UNITED STATES PATENT OFFICE.

CARL SUNDSTROM, OF SYRACUSE, NEW YORK, ASSIGNOR TO THE SOLVAY PROCESS COMPANY, OF SOLVAY, NEW YORK, A CORPORATION OF NEW YORK.

PROCESS OF RECOVERING BORAX FROM SOLUTIONS CONTAINING SODIUM BORATES.

1,349,446.     Specification of Letters Patent.     Patented Aug. 10, 1920.

No Drawing.     Application filed September 24, 1919. Serial No. 325,910.

*To all whom it may concern:*

Be it known that I, CARL SUNDSTROM, a citizen of the United States, residing in Syracuse, in the county of Onondaga and State of New York, have invented a new and Improved Process of Recovering Borax from Solutions Containing Sodium Borates, of which the following is a specification.

In the treatment of natural alkaline deposits, such as the waters of Searles lake in California, for the recovery of their contents of value, it is desirable to keep the sodium borate content of the liquor in the form of soluble metaborate until the precipitation of as much as possible of the potassium chlorid content is effected and then to convert the metaborate into the relatively insoluble tetraborate, which precipitates out, both to the end of enabling the further precipitation of potassium chlorid and for the recovery of the borax as an article of commerce.

It has heretofore been proposed to effect this conversion according to an equation of the type

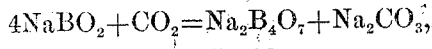

by blowing carbon dioxid gas or gas containing carbon dioxid through the solution. This method is not, however, efficient nor economical since the $CO_2$ gas is absorbed so slowly and incompletely that a large proportion of the metaborate is unconverted and a large part of the gas escapes without entering into combination and is thus wasted.

I have found, however, that if a reagent is introduced into the solution whereby $CO_2$ is set free or formed within the solution itself, the $CO_2$ is brought into intimate contact with the metaborate throughout the mass and in a nascent or quasi nascent state, and the reaction is effected neatly and efficiently and without waste. This is made possible by the fact that sodium carbonate is always present in such a solution in such quantity that sufficient $CO_2$ can always be set free therefrom to effect the reaction.

The addition of an acid, or of any substance containing $CO_2$ setting up an acid reaction, or working in any way to release $CO_2$ from the $Na_2CO_3$, will keep the reaction in the above stated equation moving from left to right, or, in other words, change the metaborate to tetraborate. I do not wish to be understood as limiting myself to the use of any one reagent. As long as the basic equation given above is involved and the $CO_2$ is evolved *in situ*, it may be used in my process.

I shall illustrate my invention by describing three applications of the use of this basic equation in recovering borax from mother liquors, or solutions containing borates, although the invention is not restricted to the use of these reagents to bring about the reaction described. I shall describe the following:

1. The treatment with sulfur dioxid
2. The treatment with trona
3. The treatment with aluminum sulfate

Sulfur dioxid treatment.

Sulfur dioxid gas is conducted into the mother liquor slowly and with frequent agitation. The absorption of the gas by the mother liquor at room temperature is practically 100 per cent. efficient. Temperature as high as 50° C. appear to have no retarding effect on this absorption. The equation involved in this action is:

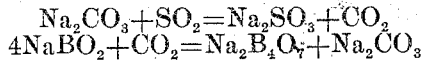

The quantity of $B_2O_3$ removed from the solution by the treatment is determined by the change in titre. If the mother liquor is maintained at or above the temperature at which it was originally, no KCl will be deposited. The treatment reduces the borax content of the liquor by about 50 per cent.

Treatment with trona.

Sodium bicarbonate will convert metaborate into tetraborate according to the reaction:

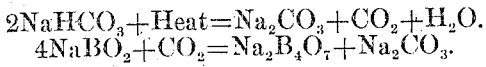

Trona, as naturally deposited, is one source of bicarbonate. The pure mineral has the composition:—

*i. e.*, 37 per cent. $NaHCO_3$. The mother liquor is treated with trona at 24° C. for 24 hours, and the same reduction of borax content as from the $SO_2$ treatment is obtained.

Treatment with aluminum sulfate.

If sodium metaborate and sodium carbonate are treated with aluminum sulfate, the following reaction takes place, probably proceeding in two stages:

I. $Al_2(SO_4)_3 + 3Na_2CO_3 + 3H_2O =$
$\quad 2Al(OH)_3 + 3Na_2SO_4 + 3CO_2$

II. $12NaBO_2 + 3CO_2 =$
$\quad 3Na_2B_4O_7 + 3Na_2CO_3$ $Al_2(SO_4)_3 + 12NaBO_2 + 3H_2O =$
$\quad 2Al(OH)_3 + 3Na_2B_4O_7 + 3Na_2SO_4$ As pure aluminum sulfate is too expensive to be practical commercially, I prefer to use some crude aluminum sulfate of the composition:

| | |
|---|---|
| $Al_2(SO_4)_3$, | 38.60% |
| Moisture, | 24.50 |
| Insolubles, | 27.90 |

To eliminate the insoluble material contained in the crude sulfate, I make a saturated solution of $Al_2(SO_4)_3$, containing 381 g. p. l. $Al_2(SO_4)_3$. This solution is added to the mother liquor. This treatment also effects the 50 per cent. reduction of the metaborate content in the mother liquor.

Having thus described my invention, what I claim as new and desire to secure by Letters Patent is:—

1. The process of removing sodium metaborate from solution which consists in forming carbon dioxid within the solution so as to convert the metaborate into sodium tetraborate and precipitating the tetraborate.

2. The process of removing sodium metaborate from solution which consists in introducing into the solution a reagent whereby carbon dioxid is caused to be set free within the solution so as to convert the metaborate into sodium tetraborate.

3. The process of removing sodium metaborate from solution which consists in introducing into the solution an acid reagent whereby carbon dioxid is caused to be set free within the solution so as to convert the metaborate into sodium tetraborate and precipitating the tetraborate.

4. The process of removing sodium metaborate from solution which consists in breaking up a constituent of the solution so as to set free carbon dioxid within the solution whereby the metaborate in converted into sodium tetraborate and precipitating the tetraborate.

5. The process of removing sodium metaborate from solution which consists in breaking up sodium carbonate contained in the solution so as to set free within the solution carbon dioxid whereby the metaborate is converted into sodium tetraborate and precipitating the tetraborate.

6. The process of removing sodium metaborate from solution which consists in breaking up sodium carbonate contained in the solution so as to set free within the solution carbon dioxid, causing the carbon dioxid to combine with the metaborate so as to form sodium tetraborate with reconstitution of the sodium carbonate and precipitating the tetraborate.

In testimony whereof I have affixed my signature, this 8th day of September, 1919.

CARL SUNDSTROM.

Witnesses:
B. L. THOMPSON,
J. L. DENNY.